Dec. 27, 1966 G. T. LYON 3,294,426
SELF-FLARING TUBE COUPLING
Filed April 19, 1965 3 Sheets-Sheet 1
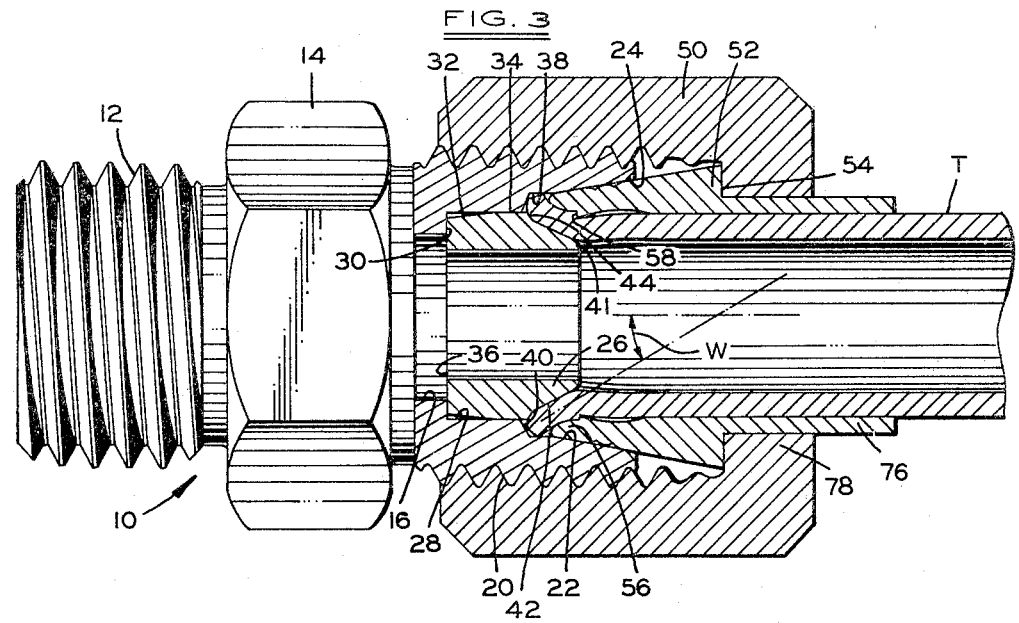
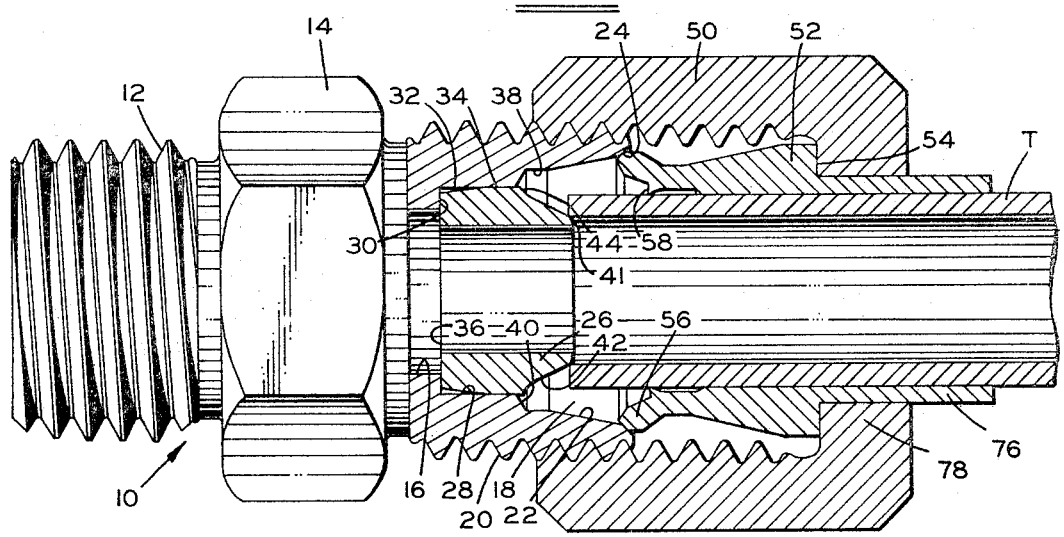
INVENTOR.
GILBERT T. LYON
BY
*Burton & Parker*
ATTORNEYS Dec. 27, 1966  G. T. LYON  3,294,426
SELF-FLARING TUBE COUPLING
Filed April 19, 1965  3 Sheets-Sheet 2

INVENTOR.
GILBERT T. LYON
BY
*Burton & Parker*
ATTORNEYS

Dec. 27, 1966          G. T. LYON          3,294,426
SELF-FLARING TUBE COUPLING
Filed April 19, 1965                                    3 Sheets-Sheet 3

INVENTOR.
GILBERT T. LYON
BY
Burton & Parker
ATTORNEYS

United States Patent Office 3,294,426
Patented Dec. 27, 1966

3,294,426
SELF-FLARING TUBE COUPLING
Gilbert T. Lyon, St. Clair Shores, Mich., assignor to
L & L Manufacturing Company, St. Clair Shores,
Mich., a corporation of Michigan
Filed Apr. 19, 1965, Ser. No. 449,037
6 Claims. (Cl. 285—334.5)

This invention relates to a self-flaring tube coupling, particularly well suited for, but not restricted to, use with steel tubing, and adapted to effect a fluid pressure-tight connection between the tubing and the coupling.

As those skilled in the tube coupling art are aware, there has long been a need for a commercially satisfactory self-flaring tube coupling which would be equally effective with both light and heavy wall steel tubing. The prior art is replete with examples of the efforts of others to design such a coupling, and the structure shown in U.S. Patent 2,850,303 is typical. My testing of prior art fittings and the reports I have received, indicate to me that each has various drawbacks.

The principal difficulty with all the prior art designs has been, in my opinion, the lack of reliable sealing when the same design is used with both light and heavy wall steel tubing. The reason for this I believe has been the fact that the problems involved in effecting a self-flaring joint with thin wall tubing are somewhat different from those confronting the designer when dealing with heavy wall tubing. Up to this time the solution has apparently been to compromise in the final design between what would be satisfactory for each tube wall thickness, but in doing so reliability has been lost, or other undesirable results obtained. For example, a design satisfactory for light wall tubing frequently will not adequately flare heavy wall tubing, and the stresses set up in the coupling are so large as to tend to undesirably distort the coupling. A coupling design effective with heavy wall tubing may not sufficiently flare a thin wall tube, with the result that the tube may be pulled or blown out of the fitting or otherwise fail to properly seal.

A study of the various problems involved has led me to the conclusion that the correct design must involve the following essential features:

(a) A quick-biting sleeve that initially bites into the tube as soon as the coupling nut is turned beyond finger tightness, thereby beginning the flaring action without allowing an uncontrolled and frequently unknown amount of slippage between the tube gripping sleeve and the tube before adequate gripping occurs;

(b) A construction of the gripping, or biting, sleeve and coupling body which will insure curling of the end of thin wall tubing about the leading end of the sleeve before the coupling is fully tightened;

(c) A construction wherein the flared end of the tube is axially squeezed between the forward end of the sleeve and an axially opposed bottom wall of the bore in the coupling body;

(d) A cooperative action between the biting sleeve and bore portions of the coupling body that does not tend to thin out the tube wall thickness during the flaring;

(e) A cooperative action between the biting sleeve and portions of the coupling body bore which do not cause thin wall tubing to inwardly collapse during flaring reducing its inside diameter beyond the diameter of the flow passageway through the coupling; and (f) The provision of an annular cavity in the coupling body at the bottom of a converging throat, into which the flared tube end is received and which allows a compensation for variations in the flared tube end arising from various tube wall thicknesses.

These features and others involved in my improved design will be discussed at greater length hereinafter.

The principal objects of my invention are the provision of a self-flaring tube coupling, which in its preferred form is suitable for use with both heavy and light wall tubing, which is reliable in sealing at reasonable torque values, may be manufactured at a reasonable cost, is easy and foolproof in use in the field, and may be repeatedly and easily coupled and disconnected without impairing its sealing qualities.

Other objects, advantages and meritorious features will more fully appear from the following specification, claims, and accompanying drawings, wherein:

FIG. 1 is a cross-sectional view through a self-flaring tube coupling showing a medium or light walled tube about to be flared and wherein the coupling nut has been screwed finger-tight against the sleeve;

FIG. 3 is similar to FIG. 2 but wherein the tube has been fully flared and sealed against the conical flaring surface and bottom of the coupling body counterbore;

Figure 2:
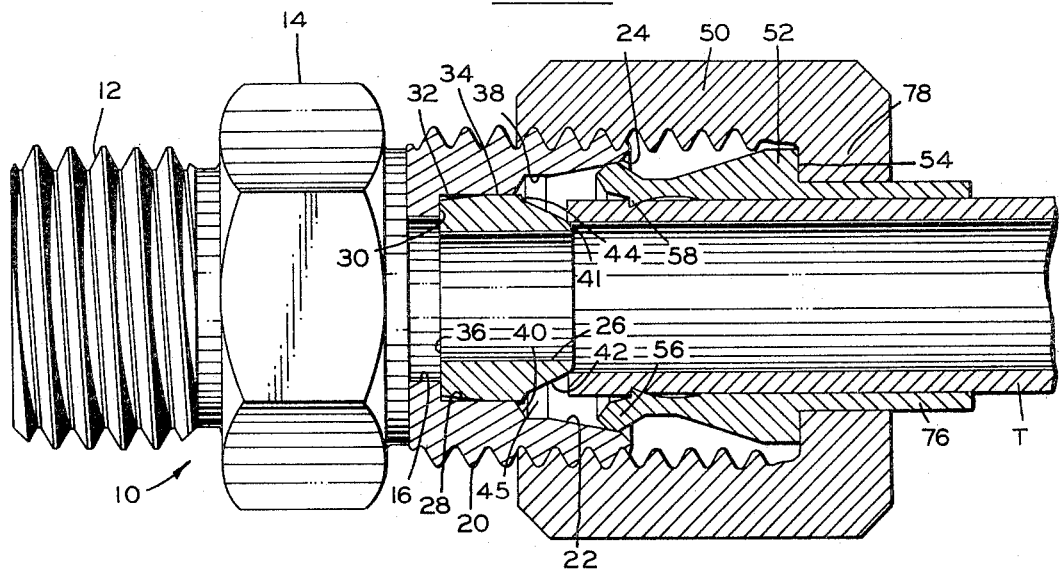
FIG. 2 is a cross-sectional view similar to FIG. 1 but wherein the coupling nut has been tightened sufficiently to cause the tube gripping sleeve to bite into the tube wall, but before any tube flaring has commenced.

The self-flaring tube coupling design shown in this application is particularly well suited for use with steel tubing of thin, medium, and heavy wall construction. As is understood by those skilled in this art, the outside diameter of thin, medium, and heavy wall tubing of any given size, is the same, but the internal diameters of the three tubes vary in accordance with the wall thickness. Because of this fact, I have found it possible to use the same size coupling body, tube gripping sleeve and coupling nut for each of the three wall thicknesses, with the only change being the provision of a slightly different flaring cone for heavy walled tubing from that for thin and medium walled tubing.

My improved design comprises a coupling body 10, one end of which is adapted to be connected, as by threads 12, with a fluid system in which the coupling is to be used. The coupling body may be provided with a wrench-engaging portion 14 for enabling threaded connection of the body to the fluid pressure system and the holding of the body during flaring and coupling of a tube T thereto. The coupling body has a flow passageway 16 therethrough which opens outwardly through a counterbore 18 in an externally threaded end 20 of the body. The counterbore has a gradually converging throat 22 which extends axially inwardly from a steeply tapering annular mouth 24.

At the bottom of the counterbore 18 is a hollow flaring cone 26 which is co-axially arranged with the counterbore and through which the flow passage 16 opens into the counterbore. The cone preferably comprises a hardened insert, which is press-fitted into a seat in the bottom of the counterbore. The seat comprises a cylindrical wall 28 and an outwardly facing seat bottom wall 30. In order to enable ready telescoping, press-fitting of the conical insert into this seat, the exterior of the insert has a slightly reduced O.D. as at 32 which tapers outwardly to a cylindrical portion 34 which is in turn a close fit in the cylindrical wall 28 of the seat. The inner end face 36 of the insert is disposed flush against the seat bottom wall 30, which together with the press fit of the portion 34 within the seat bore 28 stabilizes the insert in the seat against tilting displacement.

At the inner end of, and contiguous to the converging throat 22 is a cylindrical wall portion 38. At the inner end of and contiguous to the cylindrical wall portion 38 is a radially extending stop wall 40.

The conical flaring surface 42 of the cone 26 is provided with a radiused surface 44 adjacent the bottom of the counterbore and disposed substantially radially opposite the cylindrical surface 38. The function of this radiused surface is to outwardly curl the flaring end of a thin and medium wall tube during final increments of the flaring action. With thin and medium wall tubing the provision of this curl is considered by me to be an important provision insuring against blow-out or pullout of the tube. It also insures an adequate seal.

Figure 4:
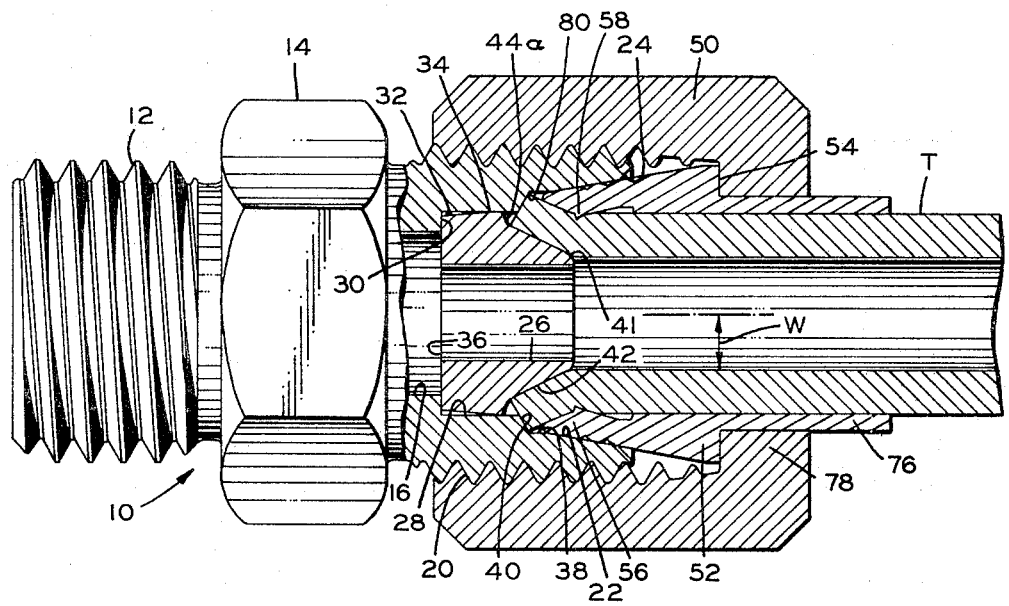
FIG. 4 shows my self-flaring tube coupling design in which heavy wall tubing has been flared and sealed within the coupling body.

The cylindrical wall 38 at the bottom of the counterbore, cooperatively with the radiused surface 44 and with the stop surface 40 provides a flared-tube-end receiving space or cavity 45, see FIG. 2, into which the curled and/or flared end of the tube may be received as shown in FIGS. 3 and 4. The flared end of the tube, it will be noted, is urged against the face 40 which serves as a stop face. The seal between the flared-tube-end and the coupling body occurs on the flaring surface of the cone and in part at least at the stop face 40.

In order to flare the sleeve on the cone, a coupling nut 50 is provided which is threadedly engaged with the threaded end 20. It is internally configured as shown to engage for relative rotation therebetween the flaring sleeve 52 axially outwardly of and against a radial shoulder 54. The sleeve has an internal diameter closely fitting the external diameter of the tube so that the sleeve and tube are substantially co-axially aligned when the sleeve is slipped over the end of the tube.

The sleeve may be formed of a ductile, case hardened metal such as, for example, free machining low carbon steel case hardened following fabrication, which I have found to be satisfactory when tubes of, for example, low carbon fully annealed steel are to be flared. The forward or inner end of the sleeve, as shown in FIG. 1, flares outwardly as at 56, before it is urged down into the throat of the counterbore. This is shown in greater detail in FIG. 6. This outwardly flared forward end 56 is disposed at substantially an acute angle with respect to the axis of the sleeve (and tube T) and is radially inwardly contractible to urge an annular biting edge or tooth 58 into the tube to grip the tube and drive the tube axially inwardly of the coupling body and cause it to be flared upon the flaring surface of cone 42.

It is to be understood that tubing of different materials may also be satisfactorily flared and sealed with my improved tube coupling design, though the design was initially developed and has been found particularly satisfactory for use with steel tubing. Of course the selection of the material for the coupling will be dictated by the material of the tube to be flared and the fluids to be handled.

Figure 6:
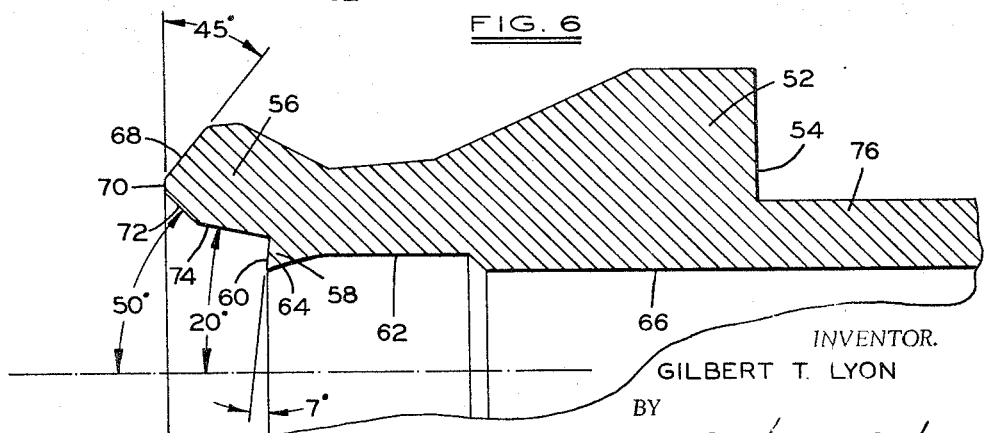
FIG. 6 is a cross-sectional view similar to FIG. 5 but showing the sleeve in another stage of its manufacture.

The biting edge or tooth 58 is disposed at the base of the flaring end of the sleeve and is preferably forwardly hooked as best shown in FIG. 6. By forwardly hooked it is meant that such biting edge slopes forwardly and defines a forwardly sloping driving face 60. Immediately axially outwardly the internal diameter of the sleeve is relieved as at 62 such that this portion of the sleeve is of a greater diameter than the diameter of the sleeve at the biting edge, and the outer face of the tooth slopes outwardly as at 64 to the greater diameter surface 62. I have found that this forward hook on the biting tooth serves to increase the effectiveness of the biting action on the tube.

Figure 5:
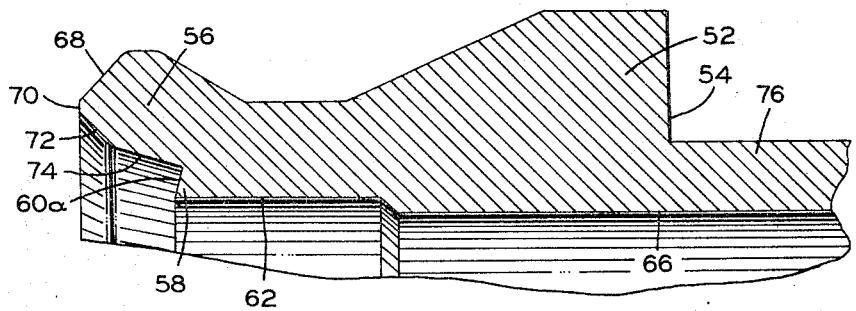
FIG. 5 is a cross-sectional view through a portion of a tube gripping sleeve showing in detail the configuration of the forward end and biting edge during one stage of its manufacture.

It will be noted that the biting edge of the tube is disposed on substantially the same diameter as the internal diameter 66 of the sleeve which closely encircles the tube, and this despite the fact that the biting tooth is provided with a forward hook. I accomplished this in one fashion by a coining operation. The forward end of the sleeve is initially formed to the configuration shown in FIG. 5 and thereafter a coining die is inserted in the sleeve and is struck against the face 60a, which serves to reduce the angle of such face and at the same time cause the biting tooth to be radially contracted and provide the relief 64 shown in FIG. 6. In this fashion the diameter of the biting edge is reduced to substantially the diameter 66 so that the biting edge will serve to more quickly bite into the tube when the outwardly flaring end portion 56 is contracted by the mouth of the counterbore of the coupling body.

The inner or forward end of the sleeve is provided with an axially inwardly (relative to the counterbore) and radially outwardly facing tapered surface 68 which is adapted to cooperate with the steeply sloping mouth 24 of the counterbore to facilitate the camming action causing a rapid initial contraction of the inner end of the sleeve as it is forced into the counterbore. In addition the sleeve is provided with a forwardly facing radial edge 70 and an axially inwardly and radially inwardly sloping surface comprising the bevels 72 and 74, which bevels, or sloping surfaces, generally parallel the conical flaring surface and radiused surface of the flaring cone such that when the tube has been fully flared, the surfaces 72 and 74 will fully back up the flared end and urge it tightly against the flaring surface, particularly the radiused surface 44, as well as the stop face 40 at the bottom of the counterbore. The sleeve is also provided with a cylindrical tail portion 76 which is encircled by the cup-shaped end 78 of the coupling nut.

It will be observed upon consideration of FIG. 4 that with heavy walled tubing the tube does not assume a curled condition around the leading edge of the sleeve, as is the case with the thin and medium walled tubings illustrated by FIGS. 1-3 inclusive. However there is a very substantial flare formed on the inner end of the heavy walled tube. The flaring cone, it will be noted in FIG. 4, has its radiused surface 44a disposed somewhat axially inwardly of the stop face 4 and that the angular disposition of the stop face 40 substantially corresponds to the slope of the end of the tube so that there is substantially flush abutment therebetween. It will also be noted that the outer corner 80 of the tube is shown disposed spaced radially inwardly from the encircling wall 38. This is a desirable condition as it does not give rise to a locking or wedging of the tube against the surface 38 preventing easy withdrawal of the tube from the coupling body in the event it is desired for any reason to disconnect the coupling body from the tube. The same feature holds true with respect to the coupling body shown in FIGS. 1-3 inclusive. The corner of the tube is intended to be spaced radially inwardly from the cylindrical surface 38, though in some instances there may be a light contact with such surface. The contact is not in any event sufficient to effect a wedging action against the surface 38 either to form a seal or to prevent easy withdrawal of a flared tube from the counterbore of the coupling body.

In FIG. 3 the letter C designates the curled end of the tube. In the thin wall tubing it is preferable to have the radiused surface 44 of the cone disposed either slightly axially outwardly of the radial stop seat 40, or substantially contiguous thereto. With heavy wall tubing, on the other hand, it is desirable to have the radiused surface 44a of the cone disposed spaced somewhat axially inwardly of the stop face 40 as heretofore mentioned. It will be apparent to those skilled in the art that the flaring cone of FIG. 4 is of a somewhat lesser axial dimension than that shown in FIGS. 1–3 and it will also have a somewhat smaller diameter at the axially outer end of its flaring surface to accommodate the smaller inside diameter of the heavy wall tubing.

The axially outer end of the cone, of both FIGS. 1–3 and the FIG. 4 design, is slightly radiused as at 41 which provides a stiffer construction for such end of the cone than if it were brought to a sharp edge.

The stop face 40 at the bottom of the counterbore is intended to limit the axial inward movement of the tube and thereby the flaring. As the leading edge of the sleeve tends to squeeze axially the flared and/or curled end of the tube against such stop face there is a solid or "hit-home" feel when during tightening of the coupling nut the parts are brought to the positions shown in FIGS. 3 and 4. This "hit-home" feeling is relatively sudden as it does not arise from any gradual squeezing or thinning out of either the flared tube end or the sleeve. In fact the annular cavity 45 provides a space into which the flared or curled end of the tube is displaced so that an axial inner end face of the flared tube end may be brought in confrontation and abutment with the stop face 40. It will also be noted that the relative sizes of the sleeve and counterbore in relation to the axial projection of the cone are such that when the tube is inserted in the counterbore against the end of the cone, the sleeve is spaced outwardly from the inner end of the tube, and when the coupling nut is tightened to the position shown in FIG. 2, the tube still projects beyond the leading end of the sleeve. After the flare is formed, the curled end of the tube lies just ahead of the leading edge of the sleeve. Therefore the relative dimensions of the parts as aforesaid are critical as they determine the amount of tube projection beyond the sleeve and in consequence the relative arrangement of the tube flare, cone, stop face 40 and sleeve, as the tube reaches its final increments of flaring movement.

I have found that with the design herein described I can form from between a 30° to a 40° flare on the end of a tube (the angle being measured to the tube centerline as shown at W in FIG. 4) while the conical flaring surface 42 of the cone is of approximately a 25° taper. With the mouth 24 of the counterbore formed at an angle of about 45°, and the converging throat tapering at about 12°, I have found the flaring and sealing action to be very satisfactory. The approximate initial angles of various faces of end 56 of the sleeve which I have found satisfactory are as follows (see FIG. 6): face 74 at 20°, face 72 at 50°, face 68 at between 40 and 45°, and face 60 at 7°.

It will be noted that in the final flared and sealed condition of FIGS. 3 and 4 the annular biting tooth 58 is disposed substantially radially opposite the outer end of the flaring cone. The projection of the tube beyond the inner end of the sleeve, as in FIG. 2, which is determined by the relative sizes and angles of the various portions of the coupling parts and tube, is such that the tube end does not collapse inwardly during flaring beyond the inside diameter of the flaring cone. The cavity 45 provides a space into which the flared end of the tube may be received to allow a compensation for variations in tube wall thickness.

Upon disassembly of the coupling after flaring a tube, the inner or forward end of the sleeve remains contracted about and backs up the flared end of the tube, so that upon reassembly of the tube in the coupling, the flared tube end is resealed in its original flared position on the cone and against the stop wall 40.

What is claimed is:

1. A self-flaring coupling comprising: a coupling body having a flow passage opening outwardly through a counter-bore in an externally threaded end of the body, said counterbore having a gradually converging conical throat extending axially inwardly from a steeply tapering conical mouth of the counterbore toward the bottom thereof and terminating in a substantially cylindrical wall at the bottom of the counterbore, a hollow tube-flaring cone coaxial with the counterbore and projecting axially outwardly from the bottom of the counterbore in radially inwardly spaced relation from said substantially cylindrical wall to define therewith an annular flare-tube-end receiving cavity, a flaring sleeve receivable over the end of a tube to be flared with the inner end of the sleeve having a steeply sloping surface whose radial dimension is substantially not greater than the maximum radial dimension of said steeply tapering mouth, said steeply sloping surface adapted to initially abut said steeply tapering mouth with the inside of the sleeve adjacent the inner end defining an annular gripping edge deformable into the tube upon radial inward deformation of the inner end of the sleeve, said sleeve having an annular area of reduced cross-section outwardly of said gripping edge to provide a weakened fulcrum area for contraction of the gripping edge of the sleeve, said steeply tapering mouth of the counterbore cooperable with said steeply sloping inner end of the sleeve to quickly contract said gripping edge into tube gripping relation by a bending of the sleeve in said fulcrum area during initial forcing of the sleeve against the steeply tapering mouth, and with the gradually converging throat of the counterbore during forcing of the sleeve down the converging throat providing an increasingly tighter gripping of the tube during flaring of the tube on the cone, said tube end during flaring radially extending into said annular cavity substantially filling the same and with the inner end of the sleeve disposed substantially wholly within the gradually tapering wall portion of the counterbore and squeezing the flared-tube-end axially inwardly against the inner end of said annular cavity, and nut means threadedly engaged with the externally threaded end of the coupling body and cooperating with the sleeve for urging the sleeve into the counterbore.

2. The invention as defined in claim 1 characterized in that the internal diameter of said sleeve outwardly spaced from said gripping edge closely fits the external diameter of the tube to coaxially align the tube and the sleeve, and said gripping edge is defined on a counterbore of said sleeve.

3. The invention as defined in claim 1 characterized in that the inner end of the sleeve flares outwardly at an acute angle to the tube to initially abut said steeply tapering mouth, and said annular gripping edge is disposed at the base of said outwardly flaring end.

4. The invention as defined in claim 3 characterized in that said biting edge at the base of the outwardly flaring end of the sleeve is inwardly hooked prior to said radial inward deformation of such end of the sleeve.

5. The invention as defined in claim 1 characterized in that prior to flaring of the tube it projects into the counterbore and abuts the tube-flaring cone with the tube end to be flared projecting ahead of the inner end of the sleeve a distance greater than the distance between the inner end of the sleeve and the gripping edge.

6. The invention as defined in claim 1 characterized in that said hollow flaring cone has an outwardly radiused surface at the base of the cone, and said counterbore has a bottom wall extending radially and disposed spaced axially inwardly from said radiused surface of the cone, and the wall of the counterbore is spaced radially outwardly from said radiused surface of the cone to provide a space therebetween into which the flaring end of a tube may extend, and the axially inner end of said sleeve urging the flared end of the tube against said radially extending wall at the bottom of the counterbore to limit inward movement of the sleeve and tube.

References Cited by the Examiner

UNITED STATES PATENTS

| | | | |
|---|---|---|---|
| 1,943,717 | 1/1934 | Barnes | 285—334.5 X |
| 2,230,116 | 1/1941 | Kriedel | 285—342 |
| 2,497,274 | 2/1950 | Richardson | 285—334.5 X |
| 2,544,109 | 3/1951 | Richardson | 285—382.1 X |
| 2,850,303 | 9/1958 | Bauer | 285—342 X |
| 2,857,176 | 10/1958 | McTaggart | 285—382.7 X |
| 3,011,807 | 12/1961 | Cowdrey | 285—382.7 X |
| 3,112,940 | 12/1963 | Crawford | 285—341 |
| 3,195,933 | 7/1965 | Jacobs | 285—342 X |
| 3,218,094 | 11/1965 | Bauer | 285—341 X |

FOREIGN PATENTS 746,910   3/1965   Great Britain.

CARL W. TOMLIN, *Primary Examiner.*

THOMAS F. CALLAGHAN, *Examiner.*

T. A. LISLE, *Assistant Examiner.*